J. F. BROWN.
ROTARY ENGINE.
APPLICATION FILED JUNE 19, 1917.

1,258,182.

Patented Mar. 5, 1918.
6 SHEETS—SHEET 4.

Fig. 4.

Witness

Inventor
J. F. Brown
By C. A. Snow & Co.
Attorneys

J. F. BROWN.
ROTARY ENGINE.
APPLICATION FILED JUNE 19, 1917.

1,258,182.

Patented Mar. 5, 1918.
6 SHEETS—SHEET 5.

Witness

Inventor
J. F. Brown
By C. A. Snow & Co.
Attorneys

UNITED STATES PATENT OFFICE.

JOHN F. BROWN, OF LA SALLE, NEW YORK.

ROTARY ENGINE.

1,258,182.  Specification of Letters Patent.  Patented Mar. 5, 1918.

Application filed June 19, 1917. Serial No. 175,649.

*To all whom it may concern:*

Be it known that I, JOHN FLETCHER BROWN, a citizen of the United States, residing at La Salle, in the county of Niagara and State of New York, have invented a new and useful Rotary Engine, of which the following is a specification.

The present invention appertains to pressure fluid engines, and aims to provide a novel and improved rotary engine utilizing steam, compressed air or other pressure fluid as motive power, and operable silently and effectively.

It is the object of the invention to provide a rotary engine which will be balanced throughout, so as to operate smoothly and without abnormal pulsations or strains, and which is equipped with packings throughout, to avoid leakage.

Another object of the invention is the provision of an engine of the rotary type, embodying a rotor rotatable within a stator, with novel rotor abutments, having a rolling contact with the rotor and operable effectively for their intended purpose, being pressed against the rotor under pressure.

Another object of the invention is the provision of a fly wheel governor for the engine, to control the speed, and operable manually during the operation of the engine, to change the speed.

A further object is the provision of novel balanced cutoff valves and valve gear, whereby the flow of steam is quickly established and cut off at the desired positions of the rotor, the cutoff being adjustable to make use of the expansion of the pressure fluid after being cut off, and to also control the speed.

It is also within the scope of the invention to improve the engine generally in its construction and details, to enhance the utility and serviceability thereof.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawings, wherein:—

The stator embodies a pair of alining casings 1, having outturned abutting flanges 2 at their adjacent ends to be bolted or otherwise fastened together, to unite the casings. Said casings are provided therein near their adjacent ends with partitions or heads 3 spaced apart to provide an intervening chamber 4. Heads 5 are bolted or otherwise fastened to the flanged remote ends of the casings, and the lower portions of the casings are formed with a base 6 to support the stator. The partitions 3 have bearings 7 projecting toward one another within the chamber 4, while the heads 5 are provided with outstanding bearings 8, through which bearings a longitudinal shaft 9 is journaled axially of the casings, said bearings being provided with anti-frictional rollers or the like to reduce friction.

The rotor is provided in two parts, to correspond with the two casings or sections of the stator, and embodies a stator drum or cylinder 10 within each casing 1, and secured concentrically upon the shaft in any suitable manner, with the ends of the drum working close adjacent to the partition 3 and head 5 of the corresponding cylinder. The drums are of smaller diameter than the casings to provide annular pressure fluid spaces therebetween. A pair of diametrically opposite blades 11 is carried by each drum or rotor member 10, said blades or vanes extending longitudinally and radially, and having T-shaped portions 12 at their inner edges slid longitudinally into correspondingly shaped grooves in the periphery of the drum to fasten the blades thereto. These blades are coextensive in length with the drum, and their outer edges are rounded, and have fitted thereon the packings 13 of arcuate section, said packings straddling the outer edges of the blades and having inturned lips 14 at their edges engaging in longitudinal grooves in the sides of the blades to fasten the packings in place. These packings work snugly along the interior surface of the corresponding casing, to prevent leakage therebetween. The blades of the two drums are arranged at right angles or quadrature with one another, whereby the rotor will be given a continuous torque, the blades of one drum laboring while the blades of the other drum are passing the abutments as will hereinafter more fully appear.

Figures 11, 12, 14:
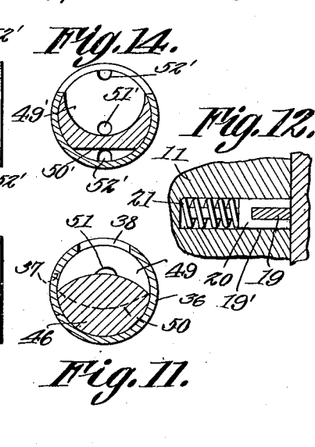
Fig. 11 is a cross section on the line 11—11 of Fig. 10.
Fig. 12 is an enlarged sectional detail of one of the packing strips and springs thereof.
Fig. 14 is a section on the line 14—14 of Fig. 13.

Packings are also provided for the ends of the drums and their blades. Thus, double packing rings 15 are fitted annular grooves 16 in the ends of the drums adjacent to the shaft 9 and peripheries of the drums, to bear against the partitions 3 and heads 5 to prevent radial leakage therebetween. These packing rings 15 are pressed against the partitions and heads by means of plungers 17 mounted slidably within the ends of the drums behind the packing rings, with coiled expansion springs 18 confined behind the plungers. Radial packing strips 19 are fitted in grooves 19' and in the ends of the blades 11, and are pressed against the partitions 3 and heads 5 by means of bifurcated plungers 20 mounted slidably in the end portions of the blades, and fitting the strips 19, as seen in Fig. 12, coiled expansion springs 21 being confined behind the plungers 20 to press the packing strips 19 against the partitions and heads to prevent leakage between the packings 13 and packing rings 15. The outer ends of the strips 19 are reduced, and engage notches in the ends of the packings 13, as at 22, to prevent leakage therebetween, while the inner ends of the strips 19 enter notches in the corresponding packing rings 15, as at 23, to prevent leakage therebetween. Thus, the packings 13 in bearing against the peripheral walls of the casings, the packing rings 15 bearing against the partitions and heads, and the packing strips 19 also bearing against partitions and heads and connecting the packings 13 and packing rings 15 will effectively prevent leakage.

The opposite sides of each casing 1 are provided with outstanding longitudinal abutment chambers 24 of circular outline, and in which the longitudinal cylindrical abutments 25 are mounted for rotary movement. Said abutments are of slightly smaller diameter than the chambers 24 so as to be capable of slight transverse movement therein, and each abutment 25 has a longitudinal recess 26 extending from end to end and opening through it periphery for the reception and passage of the blades 11 of the drum, the walls of the recesses 26 being of semi-elliptical form for the snug movement of the packings 13 along said walls as the blades pass the abutments. The abutments are mounted concentrically upon longitudinal abutment shafts 27 at opposite sides of the rotor, the abutments at each side being mounted on a common shaft 27 to rotate together, but the recesses 26 of the two abutments at each side being reversed, due to the arrangement of the blades of the two drums. Each abutment is of a diameter one half of that of the drum, whereby each abutment rotates twice for each revolution of the drum, the recess 26 of each abutment accommodating both blades of the drum as they pass the abutment. The shafts 27 extend loosely through openings 28 in the partitions 3 and heads 5, to permit the abutments to move transversely slightly, whereby to bear and to roll against the drums. Bearings 29 for the shafts 27 are disposed adjacent to the partitions 3 within the chamber 4, and next outside the heads 5, and these bearings can also have anti-friction rollers or the like. The ends of the abutments are provided with packing strips 15' therein adjacent to their peripheries, and terminating adjacent to the recesses 26, and the ends of the drums are further provided therein with packing strips 15'' adjacent to and surrounding the recesses. The ends of the companion packing strips engage each other, and these packing strips are spring pressed, the same as the rings 15 or strips 19, to bear against the partitions 3 and heads 5 to prevent leakage across the ends of the abutments. Longitudinal packing strips 32 are fitted in longitudinal slots 33 with which the casings 1 are provided opening into the chambers 24 adjacent to the exhaust sides of the abutments, said strips being held in place by pins 34 extending through slots in the strips, to limit the projection of the strips from the slots and prevent them from entering the recesses 26. The edges of the abutments along the recesses 26 are beveled or cut away, as at 34', to prevent them from catching the packing strips 32, and to bring the abutments gradually into engagement with the drums during their rotation. The abutments are forced by the fluid pressure against the drums and also against the packing strips 32, the pressure fluid flowing into the chambers 24 behind the abutments, since it will be noted that there are parti-crescent shaped spaces between the walls of the chambers 24 and abutments opening into the pressure fluid spaces or compartments in the cylinders to let the pressure fluid into said chambers 24 as stated.

Pinions 30 are secured upon the intermediate portions of the abutment shafts 27 and mesh with a gear wheel 31 secured upon the main shaft 9 between the bearings 7. These gears are located within the chamber 4, which may be filled with oil or other lubricant to lubricate the gears as well as the bearings and other parts to reduce friction and noise. The mission of the gears is to cause the drums and abutments to rotate in synchronism, rather than to drive one from the other, since it will be noted that the abutments in being pressed against the drums, will by their contact therewith be given a rolling motion.

In order to supply the pressure fluid into the two arcuate pressure fluid spaces or chambers S of each casing defined by the casing, drum and abutments, the casing is provided at those sides of the abutments opposite to the packing strips 32 with longitudinal bores 35 extending between the partition 3 and head 5, and having fitted therein tubular valve housings 36. The casing 1 and valve housings 36 are provided with pressure fluid inlet ports 37 and 38 at an angle with one another, the ports 37 opening into the inlet ends of the spaces S adjacent to the abutments, while the ports 38 communicate with longitudinal intake chambers 39 with which the casing is provided at those sides of the valve housings opposite to the abutments. The casing 1 is also provided at those sides of the abutments opposite to the valve housings and intake chambers 39, with longitudinal exhaust chambers 40 and exhaust ports 41 establishing communication between said chamber 40 and spaces S. A pressure fluid supply pipe 42 communicates with an intake chamber 39 of one casing, while an exhaust pipe 43 communicates with one chamber 40 of the two casings. As a means for bringing the intake and exhaust chambers 39 and 40, respectively, of both casings into communication, the partitions 3 and casings have cast therewith and located within the chamber 4, passages 44 and 45 extending over the bearings 7 and between the respective chambers 39 and 40. The partitions 3 have registering portions 44' bringing the alining chambers 39 of the two casings into communication, said portions 44' being in communication with the ends of the intake passage 44, whereby the pressure fluid admitted to one chamber 39 will flow into all of them. The partitions are similarly provided with registering portions 45' bringing the alining exhaust chambers 40 into communication, and said portions 45' communicate with the ends of the exhaust passage 45, whereby the exhaust can flow from all of the chambers 40 into the exhaust pipe 43 to the atmosphere.

A balanced valve 46 is rotatable in each valve housing 36, and is provided at one end with a stem 47 extending through the corresponding head 5, the valve having a conical portion 48 surrounding the stem 47 and seating in a countersunk recess in the head 5, due to the endwise pressure to which the valve is subjected, whereby to prevent leakage around the valve stem. The valve 46 is provided with alternate recesses 49 and 50 in opposite sides thereof, and in staggered arrangement, said recesses being of crescent-shape, and being brought into communication with each other by the provision of oblique holes 51 in the valve between the adjacent recesses. The recesses 49 register with the ports 38 through which the pressure fluid flows into the valve housing, and the recesses 50 are adapted to register with the ports 37 for the flow of pressure fluid into the spaces S. The valve is oscillated to establish and cut off the flow of pressure fluid, and is provided at that end opposite to the stem 47 with a hole 52 leading from the corresponding recess of the valve, to let the pressure fluid behind said end of the valve, to thrust the valve toward the head 5 to seat the portion 48 and prevent leakage. It will also be noted that pressure fluid in flowing from the recesses 49 into the opposite recesses 50, will balance the pressure against the valve, so that it can turn easily.

Coming to the valve gear for oscillating the valves, the same embodies arms 53 secured to the protruding ends of the valve stems 47 outside of the heads 5, and having rollers 54, which are cooperable with valve disks 55 secured upon the projecting ends of the shafts 27 outside of the stator, said disks being provided with cams 56 projecting from their peripheries, to engage and move past the rollers 54, whereby to rock the arms 53 and valves 46. Each cam 56 in engaging the corresponding roller 54 will turn the corresponding valve 46 to open position, thereby admitting the pressure fluid into the respective space S. A coiled torsional spring 57 is disposed between each arm 53 and adjacent head 5 and has its terminals secured thereto, and said spring has the office of turning the corresponding valve to closed position automatically and with a quick movement when the valve is released. The valve when opened is thus moved against the tension of the spring 57. A rocking latch lever 58 is pivoted, as at 59, to the respective head 5 adjacent to each valve arm 53, and has a spring 60 similar to the valve spring 57, tending to turn said latch lever to swing one arm thereof against the valve arm 53. The arm 53 has a lug 61, and the corresponding arm of lever 58 has the shoulders or steps 62 and 63. The shoulder 63 serves as a stop for the contact of the lug 61 to limit the turning movement of the valve when closed by the spring 57. When the valve is opened, the lug 61 will be moved beyond the shoulder 62 of the latch lever, so that said latch lever will spring into place to hold the valve in open position, with the shoulder 62 overlapping and holding the lug 61, this position of the parts being maintained by the spring 60, so that the valve will remain in open position until it is released by the releasing movement of the latch lever 58, to remove the shoulder 62 from the lug 61. The other arm of the latch lever 58 has a roller 64 for the engagement of a valve releasing cam.

The latch levers 58 at one end of the stator are operated by a cam disk 65 secured upon and rotated by the main shaft 9, said valve disk having diametrically opposite outstanding cams 66 to simultaneously engage the corresponding rollers 64 during the rotation of the roller, it being noted that when the valves are held in open position by the latch levers 58, the cams 66 will, in passing the rollers 64 at one end of the stator, swing the latch levers to releasing position, thus letting the valves fly closed.

The latch levers 58 at the other end of the stator are actuated by an oscillating cam disk 67 mounted loosely on the shaft 9. The disk 67 has outstanding cams 68 to oscillate past the corresponding rollers 64 to move the latch levers 58 to releasing position. The cam disk 67 is oscillated at the proper time by means of the cams 66, and for this purpose, a longitudinal rock shaft 69 below the casings 1 is journaled through end bearings 70 of the base 6, and has an arm 71 at one end connected by a link 72 with a rocking lever 73 pivoted, as at 74, to the corresponding head 5 underneath the cam disk 65. The lever 73 has a roller 75 to be engaged by the cams 66 alternated with the rollers 64. The shaft 69 has an arm 76 at the other end connected by a link 77 with a cam disk 67, whereby when the lever 73 is rocked by the cams 66 this will oscillate the cams 68 to release the corresponding valves. A suitable spring can be used if necessary to return the lever 73 and parts connected thereto when the cams 66 have passed the roller 75.

The fly wheel governor embodies a fly wheel 78 having its hub 79 keyed upon the shaft 9 to be rotated with the rotor, and the cam disk 65 is provided with a hub or sleeve 80 fitting loosely upon said shaft and extending to the hub 79. A spool 81 is threaded or otherwise secured upon the sleeve 80, and has attached thereto straps 82 to be wound thereon and unwound therefrom, said straps being in turn attached at their outer free ends to governor weights 83 slidable radially on radial guide pins 84 having their outer ends attached to the rim of the fly wheel.

Figure 1:
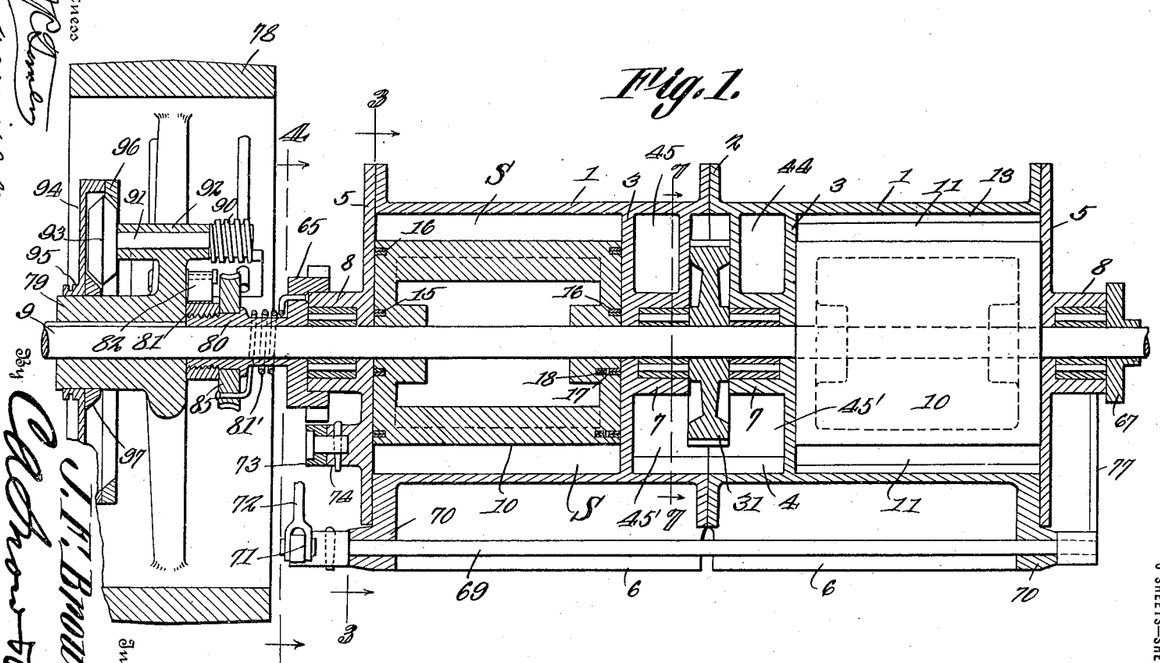
Figure 1 is a longitudinal vertical section of the engine taken on the line 1—1 of Fig. 3, portions being shown in elevation.
Figure 2:
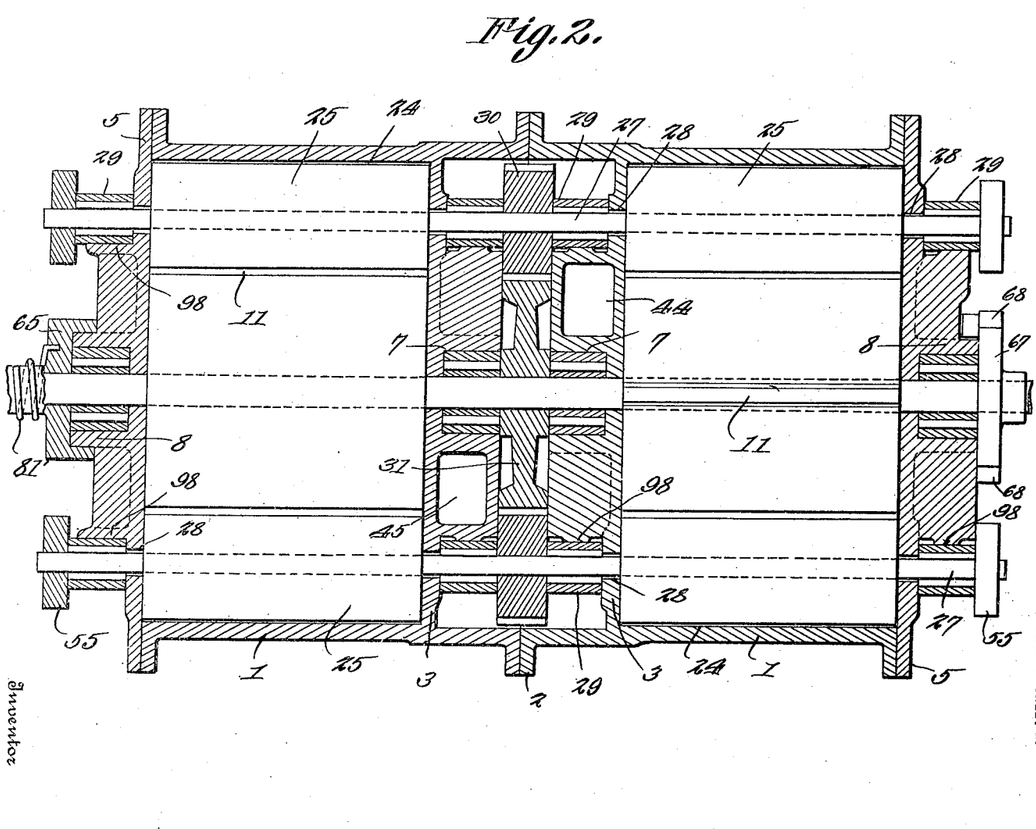
Fig. 2 is a longitudinal horizontal section on the line 2—2 of Fig. 3, portions being broken away and others shown in plan.
Figure 3:
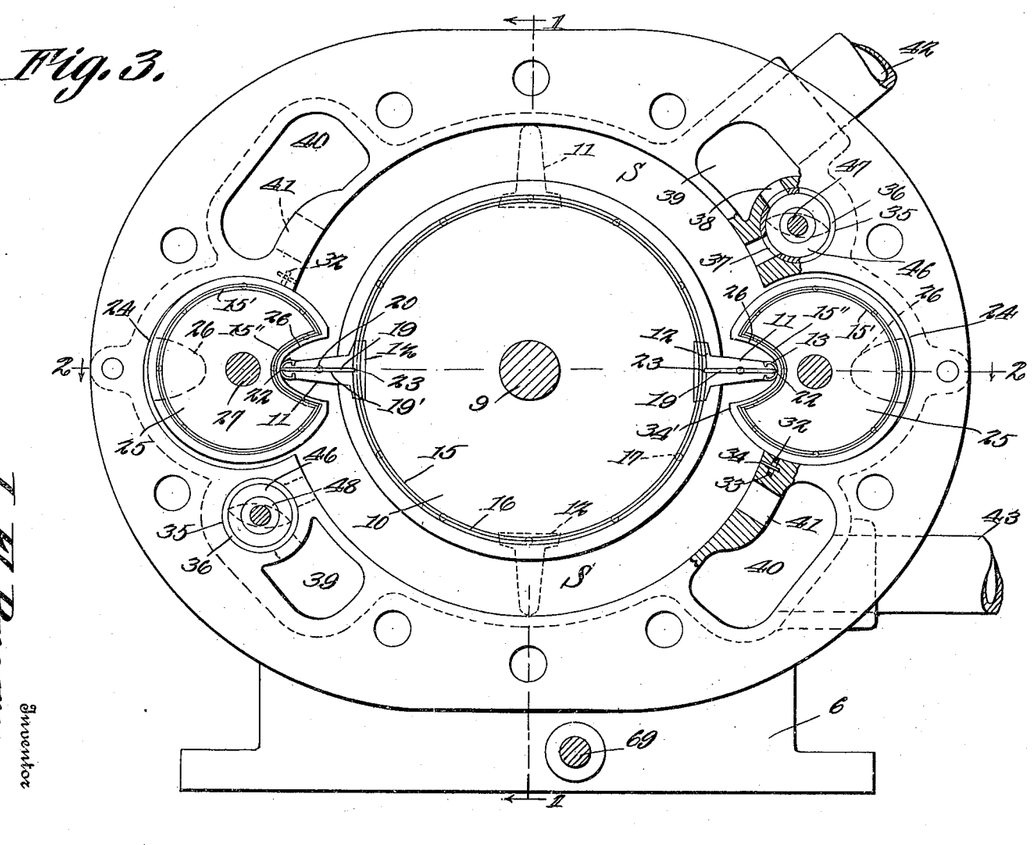
Fig. 3 is an enlarged cross section on the line 3—3 of Fig. 1.
Figure 4:
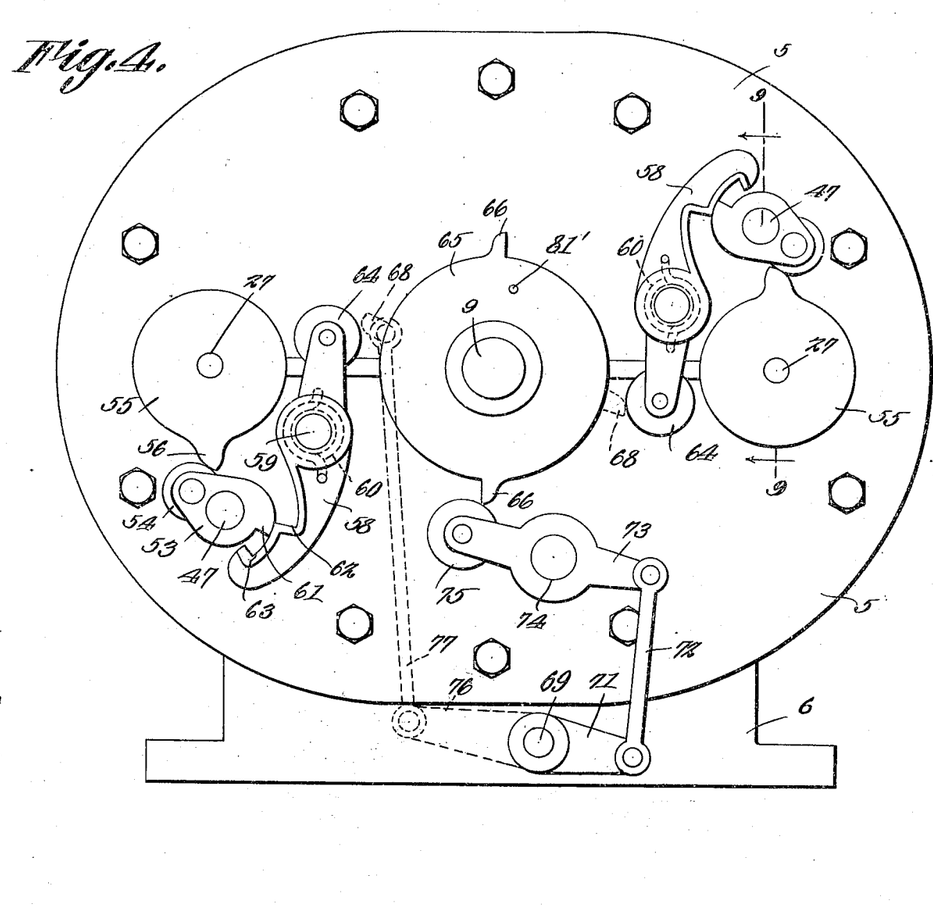
Fig. 4 is an enlarged cross section on the line 4—4 of Fig. 1, showing the valve gear.
Figures 5, 6:
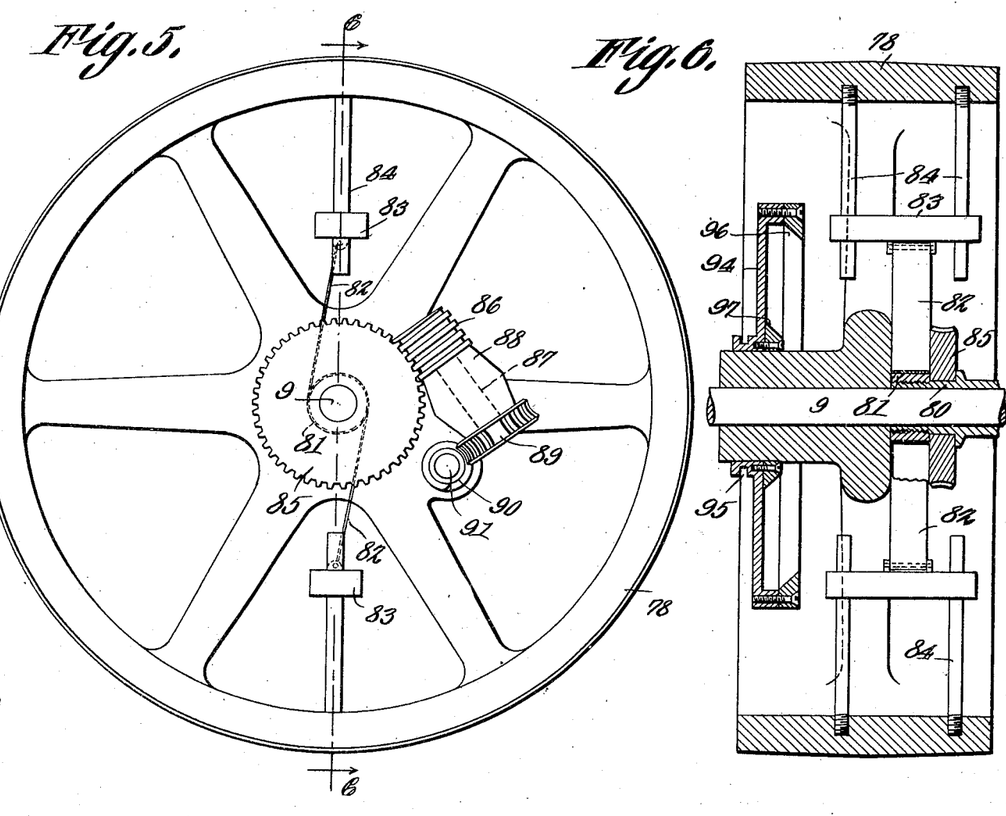
Fig. 5 is an enlarged face view of the fly wheel and governor carried thereby.
Fig. 6 is a section on the line 6—6 of Fig. 5.
Figures 7, 8:
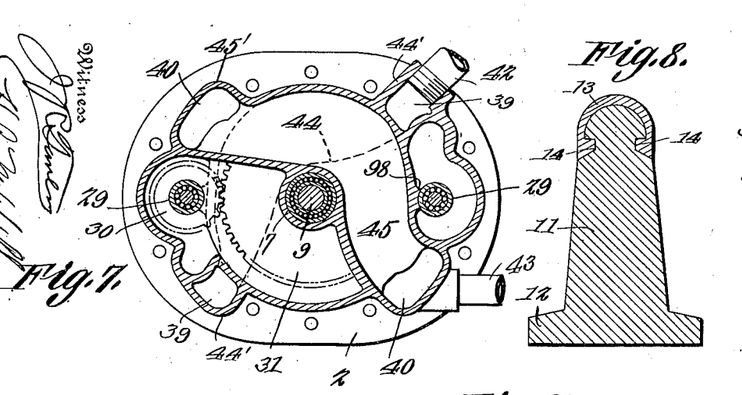
Fig. 7 is a reduced cross section on the line 7—7 of Fig. 1.
Fig. 8 is an enlarged cross section of one of the rotor blades.
Figure 9:
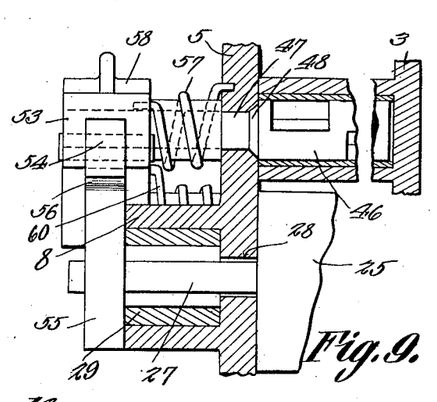
Fig. 9 is a sectional detail on the line 9—9 of Fig. 4.
Figure 10:
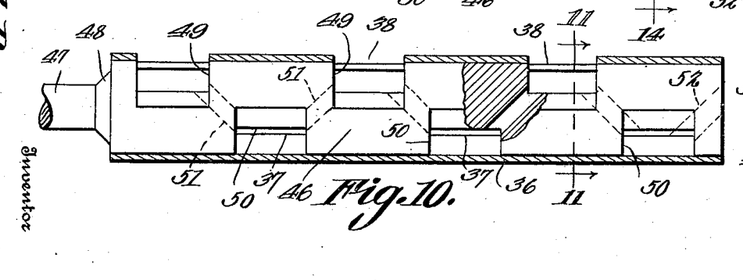
Fig. 10 is a view, partly in elevation and partly in section, of one of the balanced cutoff valves on an enlarged scale.

A worm wheel 85 rotatable on the sleeve 80, and a coiled spring 81' surrounding the sleeve 80 is disposed between and terminally secured to the cam disk 65 and worm wheel 85, to constitute a yielding connection therebetween. The straps 82 are wound upon the spool 81 in the proper direction so that when the rotor revolves counter-clockwise as seen in Fig. 3, the weights 83 in moving outwardly by centrifugal force, due to excess speed, will unwind the straps from the spool 81, and therefore rotate the sleeve 80 and cam disk 65 relatively to the shaft 9, to move the cams 66 counter clockwise relatively to the shaft 9, whereby the releasing of the valves is advanced, thereby shutting off the flow of pressure fluid quicker, to retard the speed of the engine. This serves to maintain normal speed, since when the speed increases above normal, the governor will advance the cams 66, thereby resulting in the corresponding advanced closing of the intake valves, and diminishing the power to maintain the speed normal.

The fly wheel governor has assembled therewith, means for manually changing the speed during the operation of the engine. This means embodies a worm 86 meshing with the worm wheel 85 and mounted on a shaft 87 journaled in a bearing 88 carried by the fly wheel, and a worm wheel 89 secured on shaft 87 meshes with a worm 90 secured on a longitudinal shaft 91 journaled in a bearing 92 with which the fly wheel is equipped. A double beveled friction pinion 93 is secured to shaft 91, and is coöperable with a friction disk 94 having its hub 95 slidably mounted on the hub 79 of the fly wheel. This disk 94 has the reversely beveled concentric rings 96 and 97 at the opposite sides of the pinion 93, to alternately engage the opposite beveled surfaces thereof, when the disk 94 is shifted longitudinally, the ring 96 engaging the pinion opposite to the shaft 9, while the ring 97 engages the pinion adjacent to said shaft.

When the disk 94 is moved in one direction, to bring the ring 96 against the pinion 93, said pinion is rotated in one direction relatively to the fly wheel, and by shifting the disk 94 in the opposite direction to bring the ring 97 against the pinion, the pinion will be rotated in the opposite direction relatively to the fly wheel. In this manner, during the operation of the engine, the cam disk 65 can be advanced and retarded, the pinion 93 being rotated in one direction or the other by properly shifting the disk 94. The pinion 93 when rotated will transmit motion to the worm wheel 85, which through the medium of the spring 81′, yieldably advances or retards the cam disk 65 relatively to the shaft 9, during its rotation. In this manner, the cams 66 can be shifted one way or the other relatively to the rotor and rotor shaft 9, to release the valves sooner or later, and thus control the speed manually in addition to the governor control.

The partitions 3 and heads 5 have stops 98 to limit movement of the bearings 29 of the abutments, when said abutments are brought into engagement with the blades 11, as seen in Fig. 3.

The operation of the engine will no doubt be apparent from the foregoing, but briefly stated is as follows:—

The abutments 25 rotate in timed relation with the rotor, whereby as the blades reach the abutments, the recesses 26 thereof will receive the blades, and the packings 13 will move snugly along the walls of the recesses 26 in passing the abutments. After the blades of each drum have passed the abutments and again engage the wall of the casing, the abutments again roll against the drum, and the blades have passed the intake ports 37, the cams 56 in engaging the rollers 54 will open the corresponding intake valves 46, thereby admitting pressure fluid into the spaces S between the abutments and blades, and the pressure fluid will therefore move the blades away from the abutments, counter clockwise as seen in Fig. 3, the valves being held open by the latch levers 58 until the blades 11 have moved through a certain arc, in which event, the cams 66 will release the latch levers and valves, so that the valves fly closed by their spring tension. By advancing and retarding the cams 66, the releasing of the valves can be advanced or retarded, to regulate the speed, and to give the pressure fluid an opportunity to expand before the blades reach the exhaust ports 41, thereby utilizing the expansion as well as the pressure of the fluid. When the blades reach and pass the exhaust ports 41, the pressure fluid is permitted to pass out, the blades then moving past the opposite abutments, to repeat the operation. It will be noted that when the blades of one drum pass the abutments, the blades of the other drum are laboring to actuate the rotor, thereby giving a continuous torque to the rotor.

With regard to the governor and manual control of the means for advancing and retarding the closing of the intake valves, it will be noted that the worm wheel 85 rotates with the fly wheel 78 and the shaft 9, being prevented from independent rotation by its engagement with the worm 86, and the spring 81′ will therefore yieldably hold the valve disk 65 in a position corresponding to the position of the worm wheel 85 relatively to the shaft 9. When the pinion 93 is rotated in one direction or the other, this will shift the worm wheel 85 relatively to the fly wheel and rotor shaft, and therefore change the position of the cam disk 65. As said cam disk is retarded or advanced, this will turn the spool 81 with it, so that the governor will be adjusted accordingly, but at any position of the cam disk 65 relatively to the shaft 9 the governor is operable for advancing the cam disk in the event of excessive speed, above that desired. When the governor operates, due to excessive speed, the sleeve 80 is rotated by the governor against the tension of the spring 81′, whereby said spring restores the governor and the cam disk when the speed is reduced to normal.

Figure 13:
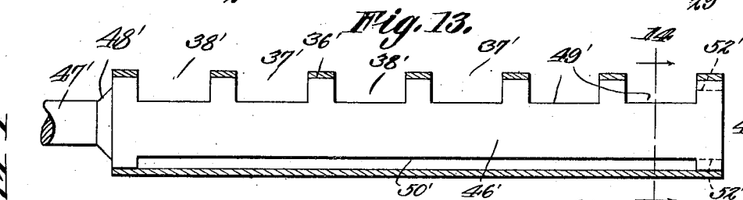
Fig. 13 is an elevation of a modified form of balanced cutoff valve, the valve casing being shown in section.

Figs. 13 and 14 illustrate a modified form of balanced pressure fluid intake valve 46′ rotatable in a housing 36′ having the alternate intake ports 37′ and 38′, the valve having a stem 47′ and conical portion 48′ at one end similar to the valve 46. The valve 46′ has recesses 49′ in one side to register with the ports, and the partitions between said recesses have holes 51′ connecting said recesses for the flow of pressure fluid therebetween. That side of the valve 46′ opposite the recesses has a longitudinal recess 50′ for receiving the pressure fluid to balance the pressure against the valve. That end of the valve opposite to the valve stem has holes 52′ for the flow of pressure fluid across said end of the valve from the corresponding recess 49′ into the recess 50′.

Having thus described the invention, what is claimed as new is:

1. A rotary engine embodying a casing having partitions near the longitudinal center thereof providing a chamber therebetween, heads attached to the remote ends of the casing, a shaft journaled in said partitions and heads, a rotor on the shaft within each end of the casing; there being blades on the rotors, rotary cylindrical abutments contacting the rotors and having recesses for accommodating said blades in passing the abutments, and gearing between the shaft and abutments located within the chamber, there being pressure fluid inlet and exhaust ports in the casing.

2. A rotary engine embodying alining casings having their adjacent ends attached together, said casings having partitions near their adjacent ends providing a chamber therebetween, heads attached to the remote ends of the casings, a rotor shaft journaled through said partions and heads, drums on said shaft within the casings having blades working along the walls of said casings, the casings having abutment chambers, rotary cylindrical abutments in said chambers having recesses for accommodating said blades in passing the abutments, longitudinal shafts extending loosely through said partitions and heads and upon which the abutments are mounted, the casings having pressure fluid inlet ports near the abutments, and gearing connecting said shafts within said chamber.

3. A rotary engine embodying a pair of alining casings having their adjacent ends attached together, said casings having partitions near their adjacent ends, heads attached to the remote ends of the casings, a rotor shaft journaled through said partitions and heads, drums upon said shaft within the casings having outstanding blades working along the walls of the casings, said casings having abutment chambers, rotary cylindrical abutments in said chambers having recesses for accommodating said blades in passing the abutments, longitudinal abutment shafts extending through said partitions and heads and upon which the abutments are mounted, the casings being provided at opposite sides of the abutments with intake and exhaust chambers, and said partitions having intake and exhaust passages establishing communication between all of the intake and exhaust chambers, respectively.

4. A rotary engine embodying a casing, a rotor therein, an intake valve controlling the flow of pressure fluid into the casing, means tending to close the valve, means operated by the rotor in one position thereof for opening the valve, a latch member for holding the valve when opened, and means operated by the rotor after moving a predetermined amount from said position for moving the latch member to releasing position.

5. A rotary engine embodying a casing, a rotor within the casing, an intake valve for controlling the flow of pressure fluid into the casing, means for closing the valve when released, means operable with the rotor for opening the valve at one position of the rotor, a latch member for holding the valve in open position, and adjustable means operated by the rotor after moving a predetermined amount from said position for moving the latch member to releasing position.

6. A rotary engine embodying a casing, a rotor therein, a pressure fluid intake valve for the casing, said valve being mounted for oscillation and closing automatically when released, a rotatable cam operable with the rotor for turning the valve to open position, a latch member for holding the valve in open position, and a second rotatable cam operable with the rotor for moving the latch member to releasing position.

7. A rotary engine embodying a casing, a rotor within the casing, a rotary abutment within the casing coöperable with the rotor, a pressure fluid intake valve for the casing near the abutment, an arm connected to the valve, a cam rotatable with the abutment for swinging said arm to open the valve, means for closing the valve when released, a latch member for holding the valve in open position, and a cam rotatable with the rotor for moving the latch member to releasing position.

8. A rotary engine embodying a casing, a rotor therein, a pressure fluid intake valve for the casing, means operated by the rotor in one position thereof for opening the valve, adjustable means operated by the rotor after moving a predetermined amount from said position for closing the valve, and means operable during the rotation of the rotor for adjusting the valve closing means.

9. A rotary engine embodying a casing, a rotor therein, a pressure fluid intake valve for the casing, means operated by the rotor in one position thereof for opening the valve, means operated by the rotor after moving a predetermined amount from said position for closing the valve and including a shiftable member for advancing and retarding the closing of the valve, and means for shifting said member during the operation of the rotor.

10. A rotary engine embodying a casing, a rotor therein, a pressure fluid intake valve for the casing, means operable with the rotor for opening the valve at one position of the rotor, means for closing the valve including a cam rotatable with the rotor and shiftable to advance and retard the closing of the valve, and means rotatable with the rotor and operable for advancing and retarding said cam.

11. A rotary engine embodying a casing, a rotor therein, a pressure fluid intake valve for the casing, means operated by the rotor for opening the valve at one position of the rotor, means operated by the rotor for closing the valve after the rotor has moved a predetermined amount from said position and adapted to be advanced and retarded, and a governor connected to the valve closing means for controlling it.

12. A rotary engine embodying a casing, a rotor therein, a pressure fluid intake valve for the casing, means operated by the rotor for opening the valve at one position of the rotor, means operated by the rotor for closing the valve after the rotor has moved a predetermined amount from said position and adapted to be advanced and retarded, a governor connected to the valve closing means for controlling it, and manually operable means for advancing and retarding the valve closing means.

13. A rotary engine embodying a casing, a rotor therein, a pressure fluid intake valve for the casing, means operated by the rotor for opening the valve at one position of the rotor, means operated by the rotor for closing the valve after the rotor has advanced a predetermined amount from said position and shiftable relative to the rotor to advance and retard the closing of the valve, manually operable means for advancing and retarding the valve closing means and yieldingly holding it in various positions with respect to the rotor, and a governor movable with the rotor and connected to the valve closing means for retarding and advancing it.

14. A rotary engine embodying a casing, a rotor therein, a pressure fluid intake valve for the casing, means for opening said valve at one position of the rotor, a shaft rotatable with the rotor, means for closing the valve after the rotor had advanced a predetermined amount from said position embodying a member on said shaft rotatable therewith and shiftable to retard and advance the closing of the valve, and a governor rotatable with said shaft connected to said member to control the position thereof.

15. A rotary engine embodying a casing, a rotor therein, a pressure fluid intake valve for the casing, means for opening said valve at one position of the rotor, a shaft rotatable with the rotor, means for closing the valve embodying a member on said shaft rotatable therewith and shiftable to retard and advance the closing of the valve, a governor rotatable with said shaft connected to said member to control the position thereof, and means rotatable with said shaft for advancing and retarding said member upon the shaft and yieldably holding it in various positions for the operation of the governor, the last mentioned means being manually controllable.

16. A rotary engine embodying a casing, a rotor therein, a pressure fluid intake valve for the casing, means for opening said valve at one position of the rotor, a shaft rotatable with the rotor, means for closing said valve embodying a sleeve mounted loosely on said shaft and adapted to be advanced and retarded thereon to advance and retard the closing of the valve, a wheel on said shaft, manually operable means carried by said wheel for advancing and retarding said sleeve, a yielding connection between said manually operable means and sleeve, and a governor carried by said wheel connected to said sleeve for advancing the sleeve when the speed of said wheel is increased above normal.

17. A rotary engine embodying a casing, a shaft therein and extending therefrom, a rotor on said shaft within the casing, a pressure fluid intake valve for the casing, means for opening said valve at one position of the rotor, means for closing said valve including a sleeve on said shaft, a fly wheel on said shaft rotatable therewith, a governor carried by the fly wheel and connected to said sleeve to turn the sleeve in one direction relatively to said shaft for advancing the closing of the valve, a member rotatable relatively to the fly wheel, a yielding connection between said member and sleeve, gearing carried by the fly wheel for rotating said member to change the relative position of the sleeve on the shaft, and manually operable means for operating said gearing during the rotation of the fly wheel.

In testimony that I claim the foregoing as my own, I have hereto affixed my signature in the presence of two witnesses.

JOHN F. BROWN.

Witnesses:
WILLIAM ARSENAN,
EARL C. BIRD.

Copies of this patent may be obtained for five cents each, by addressing the "Commissioner of Patents, Washington, D. C."